United States Patent [19]

Abthoff et al.

[11] 4,145,394

[45] Mar. 20, 1979

[54] CATALYST MONOLITH FOR EXHAUST GAS DECONTAMINATION, PREFERABLY IN MOTOR VEHICLES

[75] Inventors: Jörg Abthoff, Plüderhausen; Hans-Dieter Schuster, Grossheppach, both of Fed. Rep. of Germany

[73] Assignee: Daimler-Benz Aktiengesellschaft, Fed. Rep. of Germany

[21] Appl. No.: 451,673

[22] Filed: Mar. 15, 1974

[30] Foreign Application Priority Data

Mar. 16, 1973 [DE] Fed. Rep. of Germany ....... 2313166

[51] Int. Cl.[2] .......................... B01J 8/00; F01N 3/15

[52] U.S. Cl. .................................... 422/179; 138/108; 138/112; 422/180

[58] Field of Search ................... 23/288 FC; 138/112, 138/108

[56] References Cited

U.S. PATENT DOCUMENTS

| | | | |
|---|---|---|---|
| 2,865,721 | 12/1958 | Lane et al. | 23/288 FC |
| 3,227,242 | 1/1966 | Mattoon | 181/61 |
| 3,247,665 | 4/1966 | Behrens | 23/288 FB |
| 3,362,783 | 1/1968 | Leak | 23/288 F |
| 3,441,381 | 4/1969 | Keith et al. | 23/288 FC |
| 3,692,497 | 9/1972 | Keith et al. | 23/288 FC |
| 3,798,006 | 3/1974 | Balluff | 23/288 FC |
| 3,801,289 | 4/1974 | Wiley | 23/288 FC |
| 3,817,714 | 6/1974 | Wiley | 23/288 FC |
| 3,823,555 | 7/1974 | Cole | 23/288 FC |
| 3,861,881 | 1/1975 | Nowak | 23/288 FC X |
| 3,905,775 | 9/1975 | Sowards et al. | 23/288 FC |
| 3,961,907 | 6/1976 | Close et al. | 23/288 FC |

*Primary Examiner*—Barry S. Richman
*Attorney, Agent, or Firm*—Craig & Antonelli

[57] ABSTRACT

A monolithic catalyst structure for purifying exhaust gases particularly in motor vehicles in which the monolithic catalyst is connected with tubularly shaped metallic support members by way of a sintered intermediate layer and in which the support members carry the monolithic catalyst inside of a tubularly shaped catalyst housing through which flow the exhaust gases.

13 Claims, 1 Drawing Figure

8 11 11 1 6 9 6 5 9 3 3 4 9 7 13 9 6 6 8 8 11 12 2

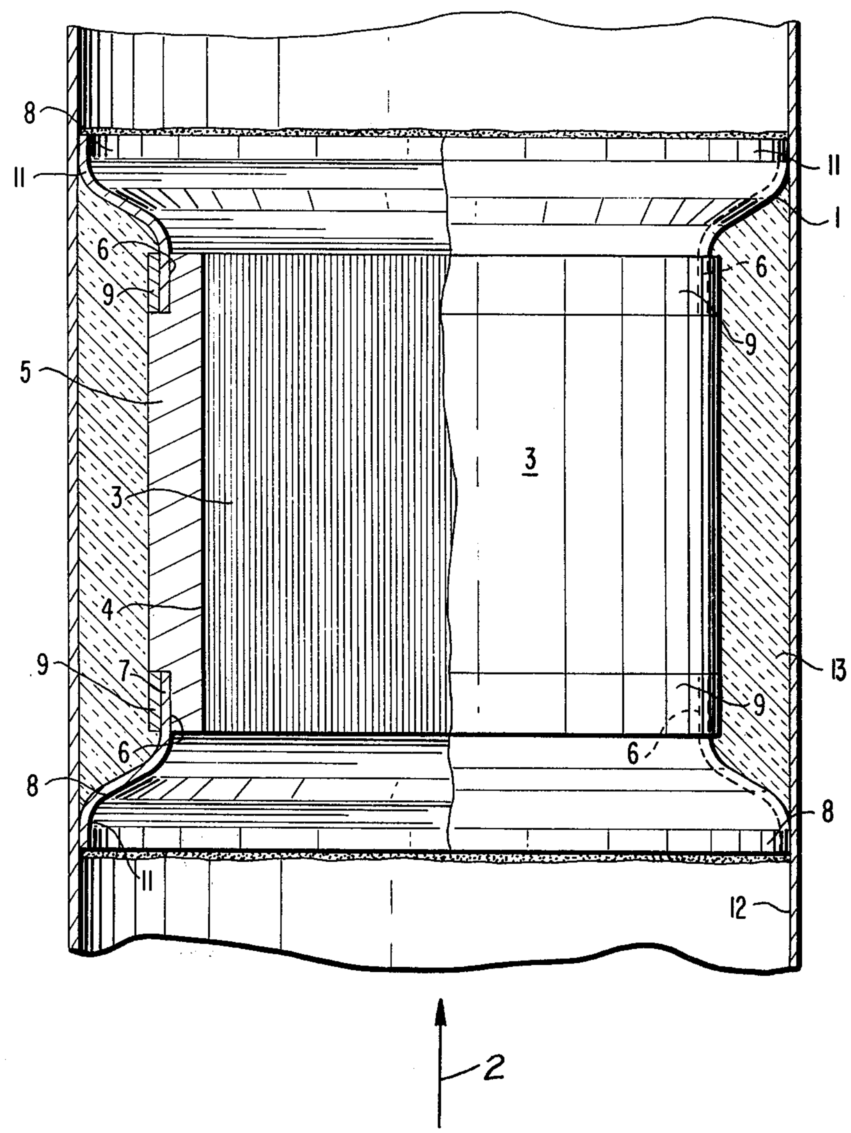
8
11
6
9
5
3
4
9
7
6
8
11
11
1
6
9
3
13
9
6
8
12
2

CATALYST MONOLITH FOR EXHAUST GAS DECONTAMINATION, PREFERABLY IN MOTOR VEHICLES

The suspension of the catalyst body inside the catalyst housing is appropriately so realized according to a further feature of the present invention that at least at the inflow side or at the outflow side of the monolith or at both of the aforementioned sides one ring-shaped recess each is provided, which is filled out respectively by the inner edge of one of the support members and by a ring-shaped sintered layer surrounding this edge. The ring-shaped recess which is filled out by the inner edge of one of the support members and by the ring-shaped sintered layer surrounding this edge, may also be provided in a ceramic intermediate layer which is applied by sintering onto the cylindrically shaped outer surface of the monolith facing the catalyst housing. This intermediate layer is matched as regards its porosity and thickness to the desired temperature gradient. This intermediate layer is provided for the very reason to improve the temperature transition and therewith the thermal stresses between the monolith and the sintered or powdered metal. This intermediate layer is not impregnated with contact materials, i.e., is not impregnated with the catalyst mass and has a porosity differing from that of the catalyst body and is acted upon only slightly by hot exhaust gases.

As to the rest, the support member for the mounting support of the monolith and for the absorption of thermal expansions is constructed in the form of a sleeve whose rim having the larger diameter is welded together with the inner wall surface of the catalyst housing and whose rim having the smaller diameter is connected with the monolith by sintering in the manner according to the present invention. By such a construction of the metal support, the otherwise customary differences in longitudinal expansion and thermal stresses between the ceramic body and the sheet metal housing can be absorbed and relative movements of the monolith in its entirety with respect to the housing can be avoided.

The present invention relates to a catalyst monolith for the exhaust gas purification, preferably in motor vehicles, and to an installation for the mounting support of the monolith in a tubularly shaped catalyst housing through which flow the exhaust gases.

Methods for embedding ceramic monoliths for the exhaust gas purification in high grade-steel containers or in steel containers are known in the art in which the ceramic monolith is so retained by wire mesh, by insulating material or by ceramic filler materials that axial or radial thermal expansions of the ceramic monolith are possible. The known methods for the suspension of the ceramic monoliths, however, involve considerable assembly costs and installation expenditures and furthermore require an additional seal between the container housing wall and the ceramic monolith.

It is the aim of the present invention to suspend the ceramic body easily installable in the housing in such a manner that the space remaining between its outer wall and the inner surface of the housing wall is sealed off without anything further by the measures to be taken in conjunction with the assembly and that the body nonetheless has possibilities for thermal expansion in all directions.

The underlying problems are solved by the present invention in that the monolith is connected with tubularly shaped metallic support members by sintering-on a dry powdered sintering metal, which support the monolith on the inside of the catalyst housing. The present invention is therefore based on clamping-in and mounting of the cylindrical catalyst body with round, oval, polygonal or eliptical base surface by means of a metal support which, on the one hand, is sintered onto the ceramic body and, on the other hand, is welded to the catalyst housing.

Finally, insulating material may be accommodated in the ringshaped hollow space, enclosed by the inner wall surface of the catalyst housing and the outer wall surfaces of the support member, on the one hand, as well as of the monolith, on the other hand. As a result thereof, the intermediate space between the catalyst housing and the monolith is filled out by an insulating material which serves as heat insulation.

Accordingly, it is an object of the present invention to provide a monolithic catalyst for exhaust gas decontamination, preferably in motor vehicles, which avoids by simple means the aforementioned shortcomings and drawbacks encountered in the prior art.

Another object of the present invention resides in a catalyst monolith for exhaust gas decontamination which is relatively simple to install and obviates the need for separate additional seals between the container housing walls and the monolith.

A further object of the present invention resides in a catalyst monolith of the type described above which is so supported that the space remaining between its outer wall and the inner surface of the housing wall is sealed off, without separate measures, by the assembly itself, without jeopardizing the possibility of thermal expansion in all directions.

Still a further object of the present invention resides in a monolithic catalyst for the decontamination of the exhaust gases of motor vehicles which is so supported that differences in longitudinal expansion as well as thermal stresses between the ceramic body and the sheet metal housing are readily absorbed while at the same time relative movements of the monolith in its entirety with respect to the housing are avoided.

A still further object of the present invention resides in a monolithic catalyst assembly of the type described above which is simple in construction, easy to install and highly effective for its intended purposes, providing appropriate heat insulation where necessary.

These and further objects, features and advantages of the present invention will become more apparent from the following description when taken in connection with the accompanying drawing which shows, for purposes of illustration only, one embodiment in accordance with the present invention, and wherein:

The single FIGURE is an axial cross-sectional view through a catalyst monolith accommodated in a pipe-shaped catalyst housing in accordance with the present invention.

Referring now to the single FIGURE of the drawing which shows a monolithic catalyst accommodated in a tubular-shaped catalyst housing, the left side thereof shows the catalyst monolith, its support member, an insulating layer and the catalyst housing in cross section while the right-hand side is a view on the catalyst monolith accommodated in the catalyst housing and on its support member whereby only the insulating layer and the tubularly shaped catalyst housing are shown in cross section.

The exhaust gases flow through the tubularly shaped catalyst housing 1 in the direction of the arrow 2.

The catalyst monolith 3 which is of conventional construction, is impregnated with a catalyst mass and burnt or sintered (vitrified) in the usual manner as known in the art. An intermediate layer 5 is applied onto the cylindrical outer surface 4 of the catalyst monolith 3; the intermediate layer 5 is not impregnated with contact substances, for example, with a catalyst mass consisting of noble metals or precious metals. The intermediate layer 5 may have a porosity differing from the monolith 3 and as a result of its lesser thickness is acted upon only slightly by the hot exhaust gases. The porosity and the thickness of the intermediate layer 5 are matched to the desired temperature gradient.

At the inflow side and at the outflow side of the monolith 3, one ring-shaped recess 6 each is provided in the intermediate layer 5. At first, the collar-shaped edge 7 having a smaller diameter of a sleeve-shaped support member 8 is inserted into this recess 6. An intermediate layer 9 is sintered over this collar-shaped edge 7 having the smaller diameter, which connects the support member 8 with the intermediate layer 5 and therewith with the catalyst monolith 3. The support member 8 has additionally a collar-shaped rim 11 with larger diameter. This rim 11 is welded onto the inner wall surface 12 of the catalyst housing 1.

If the monolith 3 is not provided with an intermediate layer, then a recess corresponding to the recess 6 is provided directly in the monolith 3 at the corresponding location and this recess is then, as described hereinabove, filled out with the rim 7 of the support member 8 and with the sintered layer 9.

An insulating material is accommodated in the ring-shaped hollow space 13 enclosed by the inner wall surface 12 of the tubularly shaped catalyst housing 1 and the outer wall surfaces of the support member 8 as well as of the monolith and its intermediate layer 5.

The exhaust gases come from the side provided with the arrow 2, enter into the catalyst monolith and flow through its fine channels formed by the support material, which extend axially to the catalyst housing and the catalyst monolith 3, and leave the catalyst monolith 3 on the other side. The entire exhaust gas, which arrives in the catalyst pipe must therefore penetrate through the catalyst monolith 3. The exhaust gases are thereby prevented by the support member 8 from by-passing the catalyst monolith 3 laterally. This support member 8, which is welded to the catalyst housing 1, thus completely seals the catalyst monolith 3 laterally. The heat transfer from the catalyst monolith 3 to the catalyst housing 1 is kept within moderate limits by the specially matched intermediate layer, by the special construction of the support member and by the insulating material accommodated in the hollow space 13. As to the rest, the special construction of the support members 8 which may consist of drawn sheet metal material or may be manufactured as machined part, enable a thermal expansion of the catalyst monolith 3 both in the radial as also in the axial direction.

As one example, the support material of the catalyst monolith may consist, for example, of about 40 to about 100% by weight of $Al_2O_3$, of from 0 to about 50% by weight of $SiO_2$ and of about 0 to about 10% by weight of MgO. The intermediate layer 5 consists in principle of the same components as the support material though also different proportions of the components may be used therefor as known to one skilled in the art. The composition and thickness of the intermediate layer should thereby be so selected and/or matched that a uniform heat flow from the catalyst to the casing will establish itself and excessive temperature differences and therewith high thermal stresses between support material and intermediate layer are avoided. The insulating material used in the hollow space is an insulating material of conventional type, as commercially available, which possesses a high temperature resistance.

While we have shown and described only one embodiment in accordance with the present invention, it is understood that the same is not limited thereto but is susceptible of numerous changes and modifications as known to those skilled in the art, and we therefore do not wish to be limited to the details shown and described herein but intend to cover all such changes and modifications as are encompassed by the scope of the appended claims.

What we claim is:

1. A catalytic converter for exhaust gas decomposition comprising catalyst housing means including an inlet passage and an outlet passage, a monolithic catalyst element in said catalyst housing means defining an inflow side, an outflow side and a plurality of passages extending between said inflow side and said outflow side, said monolithic catalyst element being positioned in said catalyst housing means so that exhaust gas passing therethrough passes through said monolithic catalyst element, said catalyst housing means being shaped in the form of a tube, said tube and said monolithic catalyst element having similar cross-sectional shapes, said monolithic catalyst element being smaller in cross section that said housing so that said monolithic catalyst element and said housing define an open space therebetween, and support means supporting said catalyst element in said catalyst housing means including at least one sleeve-shaped support member having axially spaced inlet and outlet rims of different diameters, the rim with the smaller diameter being bonded to said monolithic catalyst element, the rim with the larger diameter being secured to said catalyst housing means, said support means being bonded to said monolithic catalyst element by means of a layer of sintered metal.

2. The catalytic converter of claim 1, wherein said support means includes a sleeve-shaped support member in contact with the inflow side of said monolithic catalyst element and a sleeve-shaped support member in contact with the outflow side of said monolithic catalyst element.

3. The catalytic converter of claim 1, further comprising thermal insulation in said open space.

4. The catalytic converter of claim 1, wherein said sleeve-shaped support member is tubularly shaped.

5. The catalytic converter of claim 1, wherein said monolithic catalyst element defines on at least one side thereof a ring-shaped recess, the smaller rim of said sleeve-shaped support member being received in said ring-shaped recess.

6. The catalytic converter of claim 5, wherein the smaller rim of said sleeve-shaped support member and said metal layer substantially fill out said ring-shaped recess.

7. The catalytic converter of claim 5, wherein said monolithic catalyst element includes a ceramic intermediate layer surrounding said plurality of passages, said ring-shaped recess being defined by said ceramic intermediate layer.

8. The catalytic converter of claim 5, wherein both the inflow side and the outflow side of said monolithic catalyst element define ring-shaped recesses, and further wherein said support means includes a sleeve-shaped support member in contact with said inflow side and another sleeve-shaped support member in contact with said outflow side.

9. The catalytic converter of claim 1, wherein said layer of sintered metal forms a gas-tight seal between the smaller rim of said sleeve-shaped support member and said monolithic catalyst element.

10. The catalytic converter of claim 9, wherein at least one of the inflow side and outflow side of said monolithic catalyst element defines a ring-shaped recess, the smaller rim of said sleeve-shaped support member being received in said ring-shaped recess, said layer of sintered metal surrounding said smaller rim.

11. The catalytic converter of claim 10, wherein the smaller rim of said sleeve-shaped support member and said metal layer substantially fill out said ring-shaped recess.

12. The catalytic converter of claim 10, wherein said monolithic catalyst element includes a ceramic intermediate layer surrounding said plurality of passages, said ring-shaped recess being defined by said ceramic intermediate layer.

13. The catalytic converter of claim 10, wherein both the inflow side and the outflow side of said monolithic catalyst element define ring-shaped recesses, and further wherein said support means includes a sleeve-shaped support member in contact with said inflow side and another sleeve-shaped support member in contact with said outflow side.

* * * * *